United States Patent
Quilty et al.

(10) Patent No.: US 7,453,890 B2
(45) Date of Patent: Nov. 18, 2008

(54) CHANNEL REALLOCATION METHOD AND DEVICE

(75) Inventors: John Quilty, Athlone (IE); Noel Mannion, Athlone (IE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 548 days.

(21) Appl. No.: 10/518,348

(22) PCT Filed: Jun. 28, 2002

(86) PCT No.: PCT/EP02/07184

§ 371 (c)(1),
(2), (4) Date: Jun. 22, 2005

(87) PCT Pub. No.: WO2004/004384

PCT Pub. Date: Jan. 8, 2004

(65) Prior Publication Data

US 2005/0265361 A1    Dec. 1, 2005

(51) Int. Cl.
*H04L 12/28*    (2006.01)
(52) U.S. Cl. .................... 370/401; 370/353; 709/223
(58) Field of Classification Search ......... 370/352–356, 370/401; 709/223
See application file for complete search history.

(56) References Cited

U.S. PATENT DOCUMENTS

| 5,699,356 | A  | * | 12/1997 | Beever et al. | 370/329 |
| 6,453,356 | B1 | * | 9/2002  | Sheard et al. | 709/231 |
| 6,789,182 | B1 | * | 9/2004  | Brothers et al. | 712/30 |
| 6,944,280 | B2 | * | 9/2005  | Suzuki | 379/229 |
| 7,249,179 | B1 | * | 7/2007  | Romero et al. | 709/226 |

FOREIGN PATENT DOCUMENTS

| WO | WO 95 32591 A | 11/1995 |
| WO | WO 98 52324 A | 11/1998 |
| WO | WO 00 30369 A | 5/2000 |

\* cited by examiner

*Primary Examiner*—Steven H. D Nguyen
*Assistant Examiner*—Dinesh Goel

(57) ABSTRACT

In a communication system comprising a gateway node between a communication network 1 and a circuit-switched communication network 2 via a plurality of circuit-switched channels ch 1, . . . , chn associated with the gateway node and comprising at least two control entities to which respective groups of said channels ch 1, . . . ,chn are allocated, a method and system for reallocating the channels among the control entities, comprising an automatic monitoring of one or more sources 31, 41, 51 of communication performance information, and on the basis of data received from the sources, automatically determining whether a reallocation triggering condition is met, and if the reallocation triggering condition is met, automatically calculating a reallocation of the circuit-switched channels among the control entities.

16 Claims, 4 Drawing Sheets

CHANNEL REALLOCATION METHOD AND DEVICE

FIELD OF THE INVENTION

The present invention relates to a method and device for reallocating circuit-switched channels that are associated with a gateway node that is arranged to establish communications between a first communication network and a second circuit-switched communication network, where the reallocation is performed with respect to at least two control entities that are arranged to control communications between the two networks, where each of said control entities is allocated a respective group of said circuit-switched channels associated with the gateway node.

BACKGROUND OF THE INVENTION

In order to provide communications between different networks, it is known to employ so-called media-gateways, which are devices that convert media input from one network into a form suitable for another network. For example, media gateways can be provided between a packet-switched network (e.g. an IP based network) on the one hand and a circuit-switched network (e.g. a PSTN) on the other hand.

Furthermore, it is known to functionally separate the control over the communications between the two networks connected by the media gateway from the media gateway, by providing separate control entities, which can also be referred to as media gateway controllers. It may noted that the media gateway and media gateway controller are functionally separated, which means that they can also be physically separated, but could also be located in the same network node.

The division into a media gateway (or media gateway node) and a media gateway controller allows an increased flexibility in arranging the communication networks, and e.g. enables the separation of hardware resources from logical software resources. This division can also be exemplified by the concept of a control plane and a bearer plane, where the media gateway is at the bearer plane and the media gateway controller is at the control plane.

A special situation arises if one of the networks connected to the media gateway is a circuit-switched network, and the communication via the media gateway is handled through a predetermined number of circuit-switched channels specifically associated with the media gateway. In other words, communications to and from said circuit-switched network over said media gateway are conducted over a predetermined number of circuit-switched channels assigned to the media gateway. If more than one media gateway controller is connected to the media gateway under consideration, then the circuit-switched channels associated with the media gateway are grouped, and respective groups are allocated to each media gateway controller, such that each media gateway controller can control communications between the two networks via the circuit-switched channels in the allocated group.

In such a situation there will be a 1-to-1 relation between a software resource in the media gateway controller, a physical connection to the circuit-switched network in the media gateway, and a channel identifier, which is used in the control protocol between the media gateway and the media gateway controller.

OBJECT OF THE INVENTION

The object of the invention consists in providing a flexible and efficient way of allocating and reallocating circuit-switched channels among control entities.

SUMMARY OF THE INVENTION

This object is solved by a method described in claim 1 and a device described in claim 13. Advantageous embodiments are described in the dependent claims.

According to the present invention, the allocation and reallocation of circuit-switched channels among control entities is accomplished by automatically monitoring one or more sources of communication performance information, automatically determining whether a reallocation triggering condition is met, on the basis of data received from these sources, and if said reallocation triggering condition is met, automatically performing a reallocation procedure. The reallocation procedure calculates a reallocation of the circuit-switched channels associated with the gateway node under consideration, among the two or more control entities connected to the gateway node.

Due to the above described concept of automatically monitoring sources of communication performance information, and performing a reallocation calculation when predetermined triggering conditions are met, a reallocation of circuit-switched channels among the control entities does not have to be performed manually. Especially, the system can dynamically determine the optimum channel allocation among the control entities, such that the resources are most efficiently used in view of the momentary communication performance. For example, it can be avoided that congestion occurs with respect to a group of channels controlled by one control entity, while channels of a second group controlled by a second control entity are idle. Namely, in this case the system can perform an automatic reallocation calculation, in order to determine a better allocation of the circuit-switched channels among the control entities.

BRIEF DESCRIPTION OF THE FIGURES

The present invention will now be described by way of preferred embodiments, which are to be seen as examples but not as limiting, and by referring to the enclosed drawings in which.

DETAILED DESCRIPTION

Figure 1:
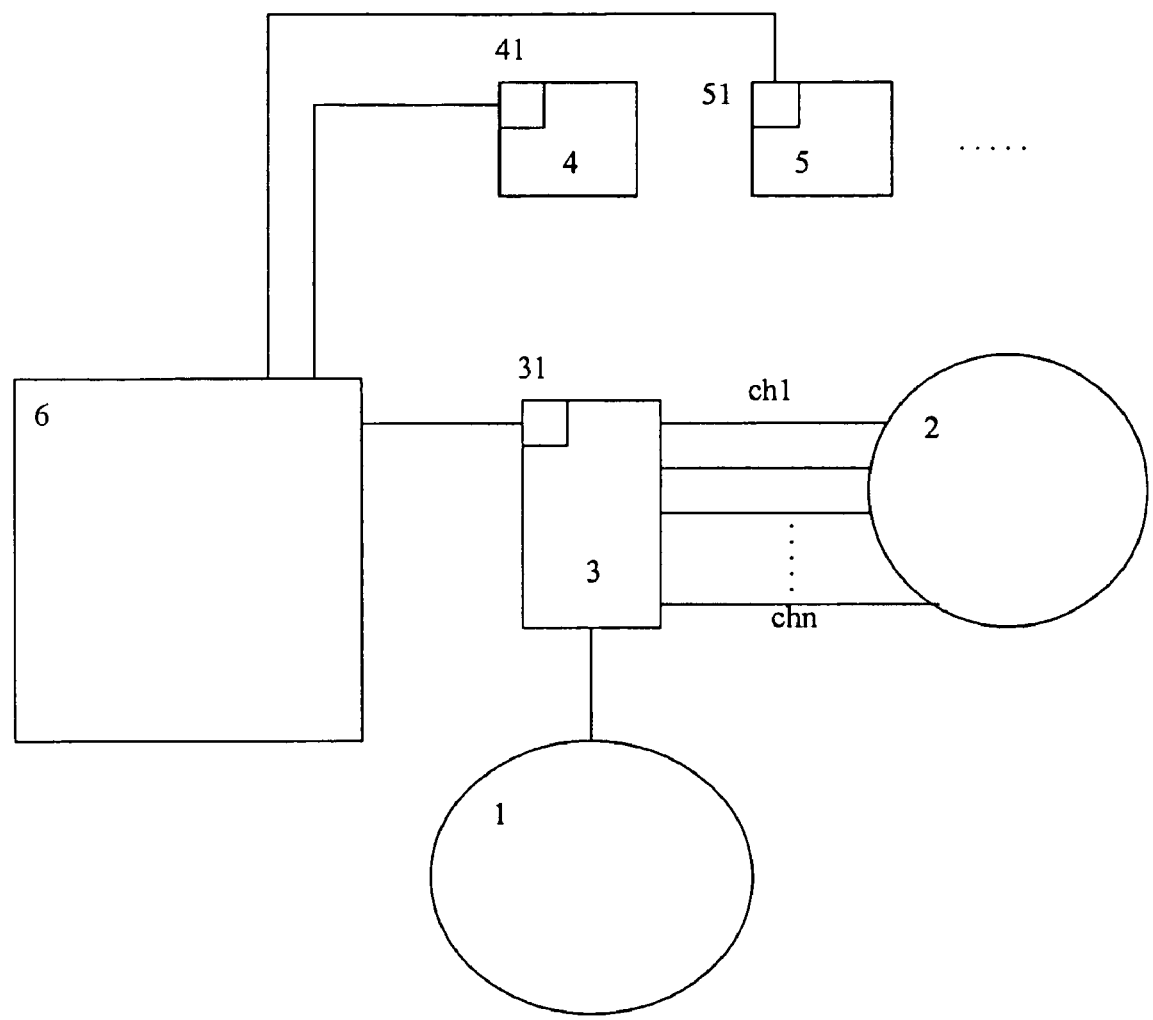
FIG. 1 gives a schematic overview of an embodiment of the invention.

FIG. 1 shows a schematic representation of an embodiment of the present invention. Reference numeral 1 refers to a first communication network and reference numeral 2 to a second, circuit-switched communication network. A gateway node 3 is provided between the networks 1 and 2, for establishing communications between the two networks. As indicated schematically in the figure, the communication from the gateway node 3 to and from the communication network 2 is conducted via a set of channels ch1 ... chn (n is a natural number), which are associated with the gateway node 3. The channels ch1 to chn are defined according to the concept of circuit-switching used in network 2 and can e.g. be time division multiplex (TDM) channels if network 2 is a TDM-based network.

It may be noted that the communication network 1 can be of any type, and can especially be packet-switched communication network, such as a network based upon the internet protocol (IP), whereas the network 2 can be any suitable circuit-switched network, such as a public switched telephone network (PSTN), or a mobile telephone network adhering to the global system for mobile communication (GSM). For example, according to a preferred embodiment the communication network 1 is a UMTS (Universal Mobile Telecommunications System) or GPRS (General Packet Radio Service) network.

The channels ch1 ... chn are divided into groups, where each group is allocated to one of a plurality of control entities 4 and 5. FIG. 1 only shows two control entities 4 and 5 for the purpose of clarity, but it should be understood that a larger number could be provided as indicated by the dots to the right of entity 5. The control entities 4 and 5 can e.g. be the media gateway controllers mentioned in the introduction to the present application.

In accordance with the present invention, an automatic reallocation handler 6 is provided which is arranged to automatically monitor one or more sources 31, 41, 51 of communication performance information, where said communication performance information relates to the use of the channels ch1, . . . , chn by the control entities 4 and 5. Furthermore, the automatic reallocation handler 6 is arranged to automatically determine whether a reallocation triggering condition is met, where said determination is conducted on the basis of the data received from the sources 31, 41, and 51. If the reallocation triggering condition is met, a reallocation procedure is conducted, for calculating a reallocation of the channels ch1, . . . , chn among the control entities 4 and 5.

Figure 2:
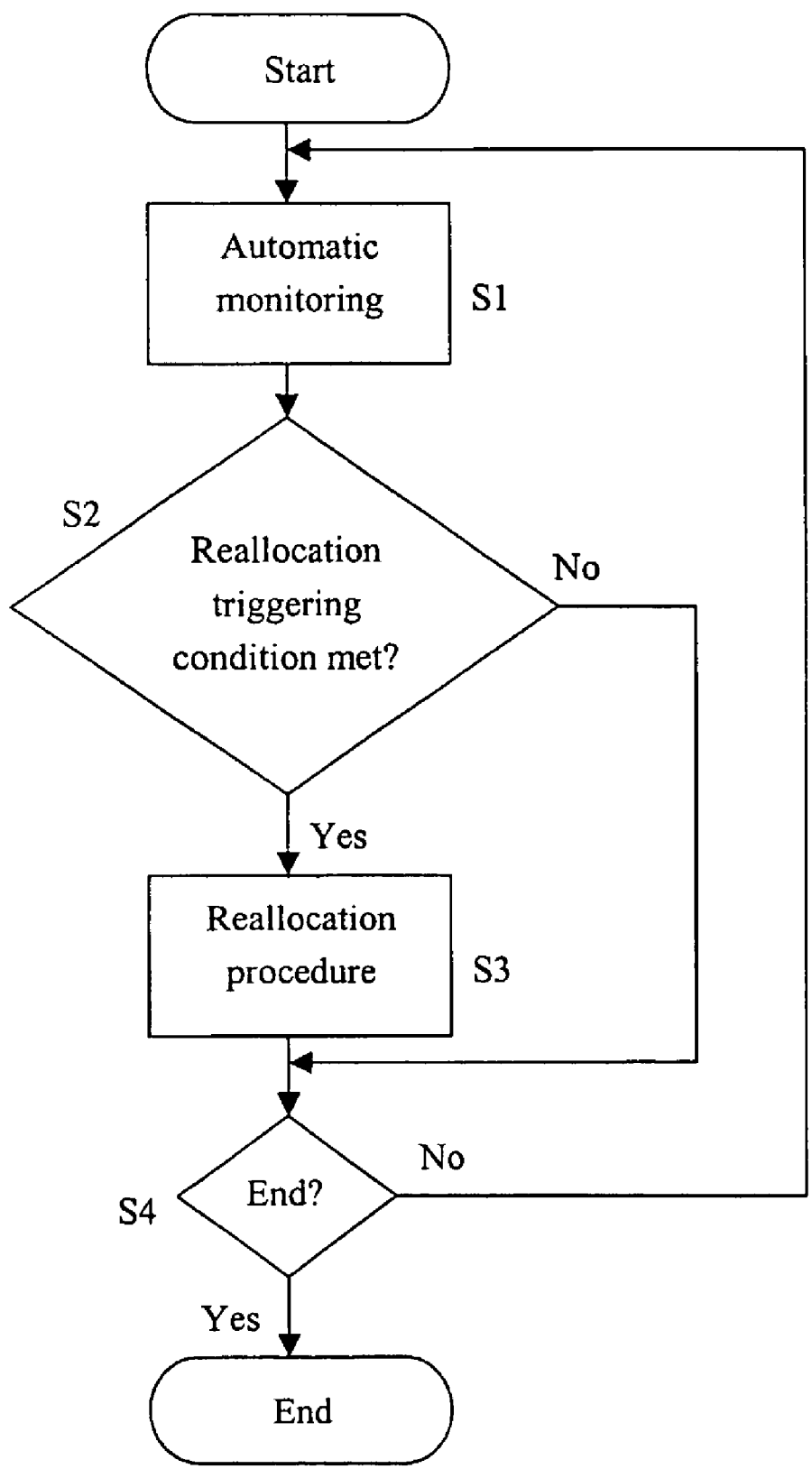
FIG. 2 shows a flow chart of a basic method according to the present invention.

A basic method performed by the automatic reallocation handler 6 is shown in FIG. 2. In a first step S1, the automatic monitoring of the sources 31, 41, 51 is conducted, and in step S2 it is determined whether a reallocation triggering condition is met or not. If a reallocation triggering condition is met, then the reallocation procedure. S3 is conducted. If the triggering condition is not met, then the procedure jumps to a determination step S4, in which it is determined whether the procedure should end or not. If it is decided to continue the procedure, the steps starting with step S1 are repeated. It should be noted that the automatic reallocation handler 6 is a functional entity that can be provided in a single physical entity or can be spread out over several entities, e.g. can be provided in one node of the network 1 (such as the gateway node 3), or can be spread out over several nodes. The automatic reallocation handler 6 can be provided by hardware, software or any suitable combination of hardware and software.

In accordance with the embodiment described in connection with FIGS. 1 and 2, it is possible to dynamically allocate and reallocate the channels ch1, . . . , chn among the control entities 4 and 5. For example, if an initial allocation of channels to the control entities is assumed to be ch1, . . . , chm (m is a natural number smaller than n) allocated to control entity 4, and chm+1, . . . , chn allocated to control entity 5, then the automatic reallocation handler 6 can be arranged to monitor the use (occupation) of the respective channel groups by the respective control entities. The automatic determining step S2 can e.g. be arranged such that the triggering condition consists in comparing whether the number of momentarily occupied channels in one group exceeds a predetermined threshold (e.g. 95%), and triggers the reallocation procedure S3 when this threshold is exceeded. Then the automatic reallocation procedure S3 can e.g. determine the momentary occupation of channels in other groups, and if there is sufficient number of idle channels, the reallocation calculation can be performed in order to allocate more of the channels ch1, . . . , chn to the control entity for which the threshold was exceeded.

With respect to the above-mentioned example of groups ch1, . . . , chm and chm+1, . . . , chn, it would e.g. be possible to reallocate channels chm+1, . . . , chk (m<k<n) from the group allocated to control entity 5 to the group allocated to control entity 4, when the automatic determining step S2 determines that the number of occupied channels in group ch1, . . . , chm exceeds a given threshold, and the reallocation procedure S3 determines that there is a sufficient number of idle channels in the group chm, . . . , chn allocated to control entity 5.

In the above example a source of communication performance information was assumed that provides an indication of the momentary channel occupation for each of the allocated groups. In general, any suitable source of communication performance information can be used, as is desirable in connection with the particular networks, gateway node and control entities involved. According to a preferred embodiment, the one or more sources of communication performance information can be a channel occupation monitor for comparing the number of momentarily occupied circuit-switched channels among the circuit-switched channels allocated to a particular control entity with one or more predetermined occupation thresholds, and/or a traffic volume monitor for comparing a time average of a number of occupied-switched channels among the circuit-switched channels allocated to a particular control entity with one or more predetermined traffic thresholds.

In the above described example, the channel occupation monitor was assumed to compare the percentage of momentarily occupied circuit-switched channels with one predetermined upper threshold (95% in the example), but such a channel occupation monitor can also perform a comparison with more than one upper threshold, where each threshold is arranged to indicate a different occupation situation. As an example, the above mentioned threshold of 95% could be a warning threshold, that congestion is to be expected, and a second threshold of 99% or 100% could be a threshold for indicating that congestion has occurred. In other words, the exceeding of the 99% or 100% threshold can be viewed as a congestion alarm, whereas the threshold of 95% can be viewed as a service alarm.

Equally, the channel occupation monitor can also be arranged to indicate when the channel occupation falls below a certain threshold, e.g. when the occupation falls below 25%, which can serve as a warning that resources are being wasted.

In summary, the channel occupation monitor can be arranged to compare the channel occupation of channels allocated to a given control entity with one or more upper and/or lower thresholds.

In place of, or in addition to the above described channel occupation monitor, which monitors the momentary channel occupation, a traffic volume monitor or performance counter can be provided for comparing a time average of the occupation of circuit-switched channels in the respective groups allocated to respective control entities. Similar to the above described situation of the channel occupation monitor, one or more upper thresholds can be defined in order to define congestion situations, and/or one or more lower thresholds can be defined, in order to indicate resource waste situations.

As indicated in FIG. 1, the sources 31, 41, 51 of communication performance information can be provided in conjunction with the gateway node 3 and/or the control entity 4 and/or the control entity 5. Also, it should be noted that the above-described threshold comparisons can be performed in the sources 31, 41, 51, or these sources may only provide information, which is compared in the automatic reallocation handler 6.

Returning to FIG. 2, the reallocation procedure S3 is preferably arranged to discriminate between reallocatable and non-reallocatable circuit-switched channels from among the channels ch1, . . . , chn, where the calculating of a reallocation is only performed for the reallocatable channels. This serves to prevent certain reserved channels, such as signalling channels, from being automatically reallocated by the automatic reallocation handler 6. According to a preferred embodiment, the automatic reallocation handler and underlying control method are arranged in such a way that the classification into reallocatable and non-reallocatable channels is user controlled, e.g. a user of the automatic reallocation handler (e.g. the operator of network 1 and/or 2) can mark certain channels among the channels ch1, . . . , chn as being non-reallocatable.

Preferably, the step S2 of automatically determining whether a reallocation triggering condition is met comprises checking whether data received from one or more of the sources 31, 41, 51 fulfils one or more rules. According to a preferred embodiment, these rules are user configurable.

The rules specify conditions that the data from the sources of communication performance information must fulfil in order to cause a consequence, said consequence also being specified by that rule. The one or more rules can thereby specify a more or less complicated reallocation triggering condition.

For example, a simple reallocation triggering condition can be specified by a single rule, according to which if the momentary channel occupation of a given group associated with a given control entity exceeds a given percentage, then a reallocation procedure will be triggered. A more complicated example would be that if the momentary channel occupation of a first given group of channels associated with a first control entity exceeds a first threshold (e.g. 95%), and the momentary channel occupation of a second given group of channels associated with a second given control entity falls below a second threshold (e.g. 25%), and the average channel occupation in the first group exceeds a given first traffic threshold (e.g. 85%), and finally the average channel occupation in the second group falls below a second traffic threshold (e.g. 40%), then a reallocation is triggered for these two groups.

As a part of the reallocation procedure S3 shown in FIG. 2, it is possible that the automatic reallocation handler also automatically executes the calculated reallocation. In other words, after having performed the reallocation calculation of circuit-switched channels among the control entities, appropriate signalling is conducted towards the gateway node 3 and the affected control entities, such that the new allocation becomes implemented.

Figure 3:
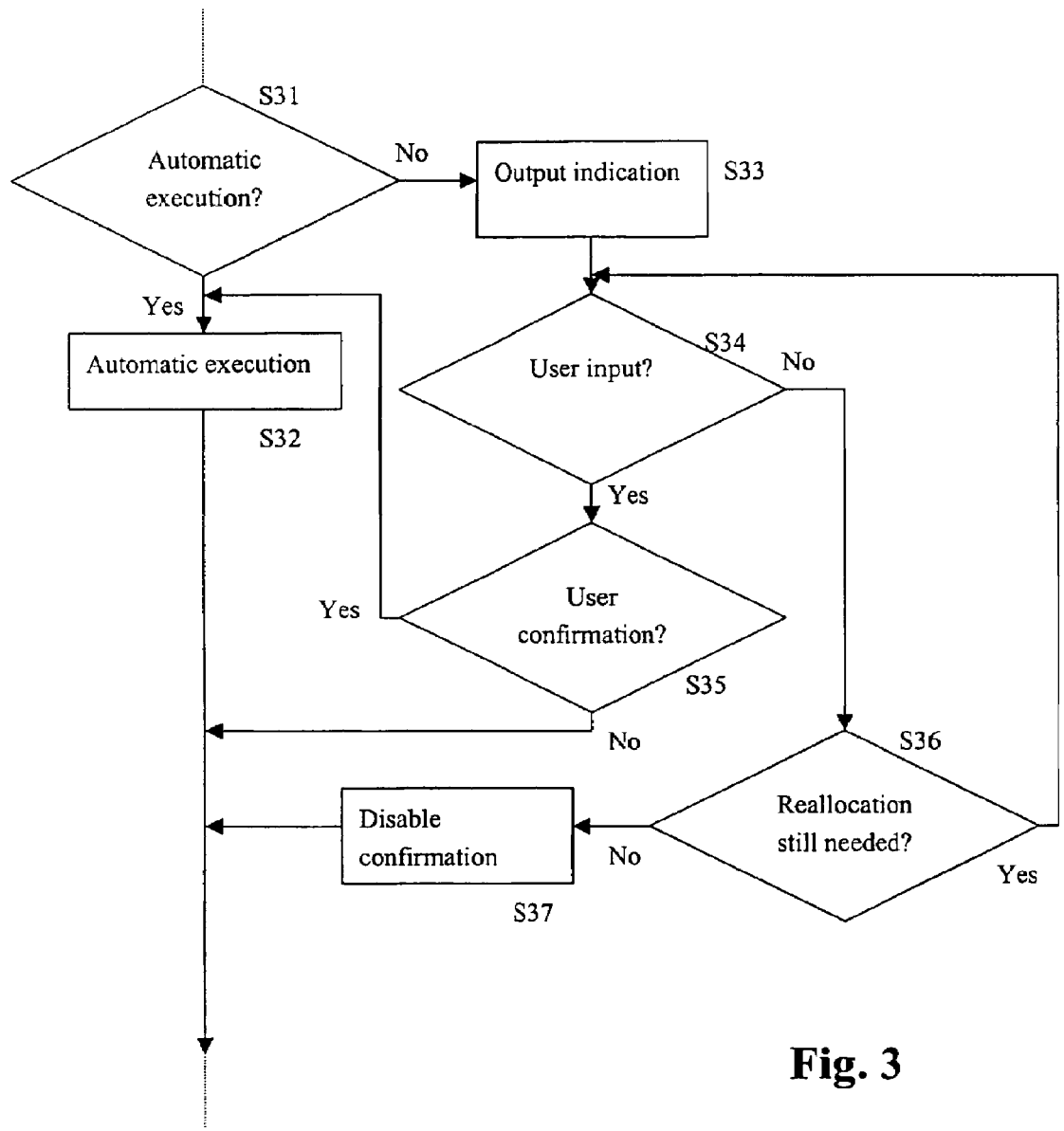
FIG. 3 shows an embodiment of a reallocation procedure that can be used in the context of the method shown in FIG. 2.

According to a preferred embodiment, the reallocation procedure S3 shown in FIG. 2 is conducted in accordance with a procedure explained in FIG. 3. The steps S31 to S37 shown in FIG. 3 constitute an example of the general reallocation procedure S3 shown in FIG. 2. According to this preferred example, the reallocation procedure S3 comprises a step S31 of checking whether a condition for automatic reallocation execution is fulfilled (i.e. whether automatic execution is allowed), and if the condition is fulfilled, executing the calculated reallocation in a step S32, as explained above. However, if the automatic reallocation execution is not allowed then an indication that a reallocation has been calculated, is output to a user, see step S33.

The checking whether the automatic reallocation execution is allowed can be done in any suitable or desirable way. For example, it is possible that a flag can be set by the user, where one flag setting indicates that automatic execution is allowed, and the other setting indicates that reallocation execution requires user confirmation. However, other possibilities for checking whether automatic reallocation execution is allowed exist, such as checking if a timing value is in a predetermined range, or if predetermined (external) signal is present or not. For example, it is possible that an automatic execution is only allowed if a timer has expired, where the timer is reset to a given value every time that an automatic reallocation execution is conducted. In this way it can be avoided that an automatic reallocation execution is conducted too often. Also, combinations are possible, e.g. that both a flag and a timer value must fulfil respective conditions.

The output of a reallocation calculation indication in step S33 can be done in any suitable or desirable way. For example, the automatic reallocation handler 6 can have an appropriate user interface (such as presentation software and a computer screen), which can communicate a notification to the user.

Subsequent to step S33, step S34 determines whether a user input has occurred, and if yes, then the subsequent step S35 determines whether the user has confirmed the reallocation. If yes, the procedure branches to step S32 for executing the calculated reallocation, and if not, then the procedures continues without executing the calculated reallocation. In other words, the reallocation procedure waits for a user confirmation input, and if the user confirmation is input, the calculated reallocation is executed.

If the outcome of step S34 is negative, then the procedure branches to step S36, in which it is determined whether the reallocation is still needed. If it is, then the procedure branches back to step S34, in order to wait for a user input. If not, then the user confirmation is disabled in step S37, and the procedure continues without execution of the calculated reallocation. The determination of step S36 is conducted on the basis of the momentary data received from the one or more sources 31, 41, 51 of communication performance information, preferably by invoking a step identical to step S2 of FIG. 2, in order to determine whether the conditions that led to the calculation of the reallocation presently under consideration still exist or not.

The disabling of the user confirmation is step S37 can be conducted in any desirable or suitable way, e.g. by removing the notification given in step S33 from the user interface, or by providing a second, different indication that a confirmation is no longer possible, and disabling a corresponding input channel from the user interface that relates to the first notification given in step S33.

According to another preferred embodiment, each calculated reallocation is recorded together with a time-stamp and information associated with the reallocation triggering condition (e.g. the affected rules that triggered the reallocation calculation). Such a log of events can be very helpful for a user when analysing the performance of the system and the performance of the automatic reallocation handler 6. As shall be explained in more detail with respect to FIG. 4, the rules for determining whether a reallocation triggering condition is met are preferably user adaptable, so that the recorded reallocation calculations can be used by the user to fine-tune the rules.

The extent to which the rules are user adaptable can be chosen as is useful or desirable. For example, it is possible that the rules are fully user definable, such that a user can write rules in an appropriate control language. Alternatively or additionally it is possible that there are predefined rules, in which the user only enters parameter values (e.g. thresholds), such as "if the momentary occupation is above x %, then reallocate", where the user must only specify the value for x.

Figure 4:
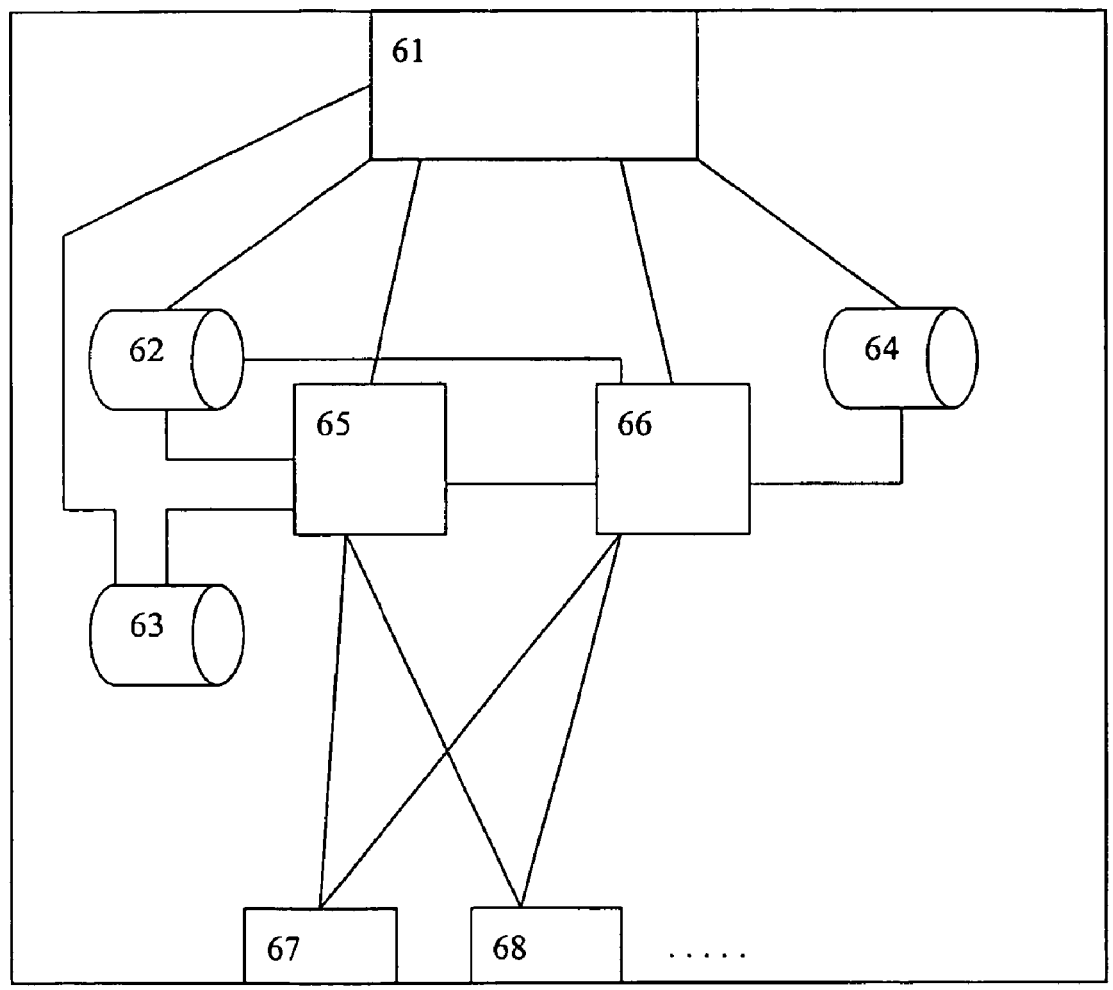
FIG. 4 shows a schematic representation of an automatic reallocation handler of the present invention.

FIG. 4 shows a schematic representation of a preferred embodiment of the automatic reallocation handler 6. As already mentioned, the automatic reallocation handler 6 can be implemented as hardware, software or any suitable combination of hardware and software, such that the entities 61-68 to be described in connection with FIG. 4 can equally be embodied by hardware, software or any suitable combination thereof.

Reference numeral 61 relates to a user interface, reference numeral 62 to an event log for recording reallocation calculation events, reference numeral 63 relates to a task data base, reference numeral 64 to a rule data base, reference numeral 65 to a task module, reference numeral 66 to a rules module, and reference numerals 67 and 68 to interface adapters for interfacing with control entities such as media gateway controllers 4 and 5 of FIG. 1.

The automatic reallocation handler 6 shown in FIG. 4 is fully user configurable via the user interface 61. The user interface 61 can interact with the task database 63, in order to define one or more automatic monitoring tasks with respect to the sources of communication performance information. For example, a task can indicate which information to acquire from which node. Furthermore, the user interface interacts with the rules database 64, in order to let the user create rules. As already described above, a rule specifies one or more conditions that relate to the meeting of a reallocation triggering condition. For each rule, it is specified when the checking of the rule is triggered (e.g. the receipt of which communication performance information triggers a checking of the rule), and which result the rule will trigger, e.g. the consequence of the rule. These consequences of the rules can also be defined as tasks in the task database 63, such that the user interface 61 can also interact with the task database 63, in order to define configuration actions to be undertaken within such a task.

The task module 65 is arranged to interact with the task database 63, in order to fetch task details and then execute such task details on affected nodes via the appropriate node interface adapter 67, 68. It may be noted that customarily one node interface adapter will exist for each gateway node 3 and each control entity 4, 5. The node interface adapter converts the interface format towards the node to/from the format used in the automatic reallocation handler 6. For example, in a multi-vendor network, one node may implement a SNMP (Simple Network Management Protocol) interface, while another may implement a CORBA (Common Object Request Broker Architecture) interface, or a propriety interface. By providing the node interface adapters, the automatic reallocation handler can communicate with any node.

The rules module 66 responds to information received from one or more of the nodes (both gateway nodes and control entities) via the appropriate interface adapter 67, 68. Namely the rules module receives the communication performance information (e.g. an alarm, such as a congestion alarm, or simply traffic or channel occupation information, which is then processed further in the automatic reallocation handler 6). In response to receiving such communication performance information, the rules module 66 fetches one or more rules associated with the received information from the rules database 64, and checks the rules to see if this leads to any task execution as a consequence. If the consequence is a task execution (which means that a reallocation procedure is triggered), then a request is sent to the task module 65, such that the given task may be performed. Also, it is possible that the rules module 66 interacts with the event log 62, in order to record the occurrence of receiving communication performance information, performing a rule check and identifying the requested task if a task is requested.

If a task is requested, the task module 65 checks whether the action can be performed automatically (see step S31 and subsequent steps in FIG. 3), and if so, fetches details of the given task from the task database. Then the task module 65 contacts the affected nodes and implements the calculated reallocation via the appropriate node interface adapters 67, 68. Preferably, details of the reconfiguration are in any case (i.e. regardless of whether a reconfiguration was executed or not) logged in the event log 62.

If the task module 65 determines that the task cannot be performed automatically, then the appropriate indication (also see step S33 FIG. 3) can be output to the user via the user interface 61. Preferably, after a reconfiguration has been executed, an appropriate notification is also given to the user via the user interface 61.

As already mentioned, the automatic reallocation handler 6 can also be implemented as software. Consequently, the present invention can also be embodied in the form of a computer program arranged to execute one of the above-described methods when loaded into and executed on a data processing device connected to one or both a gateway node and said control entities. Furthermore, the present invention can also be embodied as a data storage device storing such a computer program.

As already mentioned initially, the above description of detailed examples and embodiments is only intended to provide the skilled person with a better understanding of the invention, and is not intended to be limiting or restricting. For example, although FIG. 1 only shows two networks, the present invention can also be used in connection with a larger number of networks. Equally, although FIG. 1 only shows one gateway node 3, the automatic reallocation handler 6 can be arranged to interact with an arbitrary number of gateway nodes 3 and any suitable or desirable number of control entities 4, 5.

Further equivalent arrangements will occur to the skilled person, which are all intended to fall into the scope of the invention defined by the appended claims. Reference numerals in the claims are intended to make the claims easier to read, and are not to be understood as limiting.

The invention claimed is:

1. In a communication system comprising a gateway node arranged to establish communications between a first communication network and a second circuit-switched communication network via a plurality of given circuit-switched channels of said second communication network, said given circuit-switched channels being associated with said gateway node, and at least two control entities arranged to control communications between said first and second networks, where each of said control entities is allocated a respective group of said given channels for control, a method for reallocating said given circuit-switched channels among said control entities, comprising the steps of:

automatically monitoring one or more sources of communication performance information, by
comparing a number of momentarily occupied circuit-switched channels among the circuit-switched channels allocated to a particular control entity with one or more predetermined occupation thresholds, and
comparing a time average of a number of occupied circuit-switched channels among the circuit-switched channels allocated to a particular control entity with one or more predetermined traffic thresholds;

on the basis of data received from said one or more sources of communication performance information, automatically determining whether a reallocation triggering condition is met, and if said reallocation triggering condition is met, automatically performing a reallocation procedure for calculating a reallocation of said given circuit-switched channels among said control entities.

2. The method of claim 1, wherein said circuit switched channels are time division multiplex channels.

3. The method of claim 1, wherein said reallocation procedure comprises discriminating between reallocatable and non-reallocatable circuit-switched channels, where the calculating of a reallocation of circuit-switched channels is only performed for the reallocatable circuit-switched channels.

4. The method of claim 1, wherein the step of automatically determining if a reallocation triggering condition is met comprises checking whether data received from said one or more sources of communication performance information fulfills one or more rules.

5. The method of claim 4, wherein said one or more rules are user configurable.

6. The method of one claim 1, wherein said reallocation procedure comprises a step of checking whether a condition for automatic reallocation execution is fulfilled, and if the condition is fulfilled, executing the calculated reallocation, and otherwise outputting an indication to a user that a reallocation has been calculated.

7. The method of claim 6, wherein after having output said indication to a user that a reallocation has been calculated, said reallocation procedure waits for a user confirmation input, and if said user confirmation is input, executing the calculated reallocation.

8. The method of claim 7, wherein while waiting for said user confirmation input, said reallocation procedure determines, on the basis of the momentary data received from said one or more sources of communication performance information, whether the calculated reallocation for which said indication was output is still needed, and if not, disables the user confirmation.

9. The method of claim 6, wherein said condition for automatic reallocation execution is the presence of one or more of a predetermined timing value, a predetermined flag setting, and a predetermined signal.

10. The method of claim 1, wherein each calculated reallocation is recorded together with a time-stamp and information associated with the reallocation triggering condition that triggered the reallocation calculation.

11. In a communication system comprising a gateway node arranged to establish communications between a first communication network and a second circuit-switched communication network via a plurality of given circuit-switched channels of said second communication network, said given circuit-switched channels being associated with said gateway node, and at least two control entities arranged to control communications between said first and second networks, where each of said control entities is allocated a respective group of said given channels for control, a device for reallocating said given circuit-switched channels among said control entities, comprising:

an automatic monitor for automatically monitoring one or more sources of communication performance information, and for automatically determining whether a reallocation triggering condition is met, on the basis data received from said one or more sources of communication performance information the automatic monitor comprising the following:

a channel occupation monitor for comparing a number of momentarily occupied circuit switched channels among the circuit-switched channels allocated to a particular control entity with one or more predetermined occupation thresholds, and a traffic volume monitor for comparing a time average of a number of occupied circuit switched channels among the circuit-switched channels allocated to a particular control entity with one or more predetermined traffic thresholds, and an automatic reallocator responding to said automatic monitor, for automatically performing a reallocation procedure for calculating a reallocation of said given circuit-switched channels among said control entities.

12. The device of claim 11, furthermore comprising an event log memory for recording each calculated reallocation together with a time-stamp and information associated with the reallocation triggering condition that triggered the reallocation calculation.

13. The device of claim 11, further comprising a rule data base memory accessible by said automatic monitor, said automatic monitor being arranged to automatically determine whether a reallocation triggering condition is met by checking whether data received from said one or more sources of communication performance information fulfills one or more rules stored in said rule data base memory.

14. The device of claim 13, further comprising a user interface connected to said rule data base memory, said user interface and said rule data base memory being arranged such that the rules stored in said rule data base memory can be configured via said user interface.

15. The device (6) of claim 11, wherein said automatic reallocator is arranged to check whether a condition for automatic reallocation execution is fulfilled, and if the condition is fulfilled, to execute the calculated reallocation, and otherwise to output an indication that a reallocation has been calculated.

16. The device of claim 11, further comprising one or more interface adapters, each being arranged to convert a format used inside the device into an interface format used in a node with which the interface adapter is designed to be connected.

* * * * *

UNITED STATES PATENT AND TRADEMARK OFFICE
CERTIFICATE OF CORRECTION

PATENT NO. : 7,453,890 B2
APPLICATION NO. : 10/518348
DATED : November 18, 2008
INVENTOR(S) : Quilty et al.

It is certified that error appears in the above-identified patent and that said Letters Patent is hereby corrected as shown below:

In Column 9, Line 23, in Claim 6, after "method of" delete "one".

In Column 10, Line 45, in Claim 15, after "device" delete "(6)".

Signed and Sealed this

Twenty-eighth Day of April, 2009

JOHN DOLL
*Acting Director of the United States Patent and Trademark Office*